United States Patent [19]

Miyazaki et al.

[11] Patent Number: 6,106,688

[45] Date of Patent: Aug. 22, 2000

[54] METHOD FOR MANUFACTURING A SUSPENSION ELEMENT FOR A MAGNETIC HEAD

[75] Inventors: Yukio Miyazaki; Hitoshi Suzuki; Hidehiko Fujisaki; Koji Nakamura; Mitsuo Yamashita; Masami Nakajyoh; Masashi Takada, all of Kawasaki, Japan

[73] Assignee: Fujitsu Limited, Kawasaki, Japan

[21] Appl. No.: 08/961,594

[22] Filed: Oct. 30, 1997

[30] Foreign Application Priority Data

May 22, 1997 [JP] Japan .................................... 9-132466

[51] Int. Cl.[7] ...................................................... C25D 5/02
[52] U.S. Cl. ............................................ 205/129; 205/152
[58] Field of Search ................ 216/91, 105; 204/192.15, 204/192.17, 206; 205/138, 128, 129, 151, 152

[56] References Cited

U.S. PATENT DOCUMENTS

| | | | |
|---|---|---|---|
| 2,373,273 | 1/1945 | Sziklai | 179/100.1 |
| 3,391,073 | 7/1968 | Rusch et al. | 204/202 |
| 3,888,745 | 6/1975 | Hojyo | 204/18 R |
| 5,264,096 | 11/1993 | Jorgens | 204/180 |
| 5,607,520 | 3/1997 | Tipton | 148/241 |
| 5,618,388 | 4/1997 | Seeser et al. | 204/192.12 |
| 5,837,120 | 11/1998 | Forand et al. | 205/93 |

FOREIGN PATENT DOCUMENTS

| | | |
|---|---|---|
| 6-215513 | 8/1994 | Japan . |
| 7-57418 | 3/1995 | Japan . |
| 7-235156A | 5/1995 | Japan . |
| 7-235156 | 9/1995 | Japan . |
| 7-262541 | 10/1995 | Japan . |

*Primary Examiner*—Kathryn Gorgos
*Assistant Examiner*—Erica Smtih-Hicks
*Attorney, Agent, or Firm*—Armstrong, Westerman, Hattori, McLeland & Naughton

[57] ABSTRACT

Provided are a method for manufacturing a suspension element having a pattern of wiring lines and an equipment for the same. The method includes the steps of: preparing a roll of band-shaped sheet used as a substrate of the suspension element; sequentially performing processes to the sheet through a series of processing sections to integrally form the suspension element with the pattern of wiring lines within a predetermined region of the sheet, and transferring the sheet in a wound state like a roll from one of the processing sections to the next processing section.

4 Claims, 14 Drawing Sheets

METHOD FOR MANUFACTURING A SUSPENSION ELEMENT FOR A MAGNETIC HEAD

BACKGROUND OF THE INVENTION

CROSS-REFERENCES TO RELATED APPLICATIONS

This application is related to Japanese Patent Application No. Hei 9(1997)-132466, filed on May 22, 1997 whose priority is claimed under 35 USC Section 119, the disclosure of which is incorporated herein by reference in its entirety.

1. Field of the Invention

The present invention relates to a method for manufacturing a suspension element for a magnetic head, and more particularly to a method for mass-producing suspension elements by allowing a plurality of processing sections to sequentially perform necessary processing steps while conveying a band-shaped sheet(substrate) by means of rolls.

2. Description of the Related Art

In a magnetic disk device for a computer, a so-called CSS (Contact Start Stop) method has generally been employed in which an actuator positions a magnetic head on a desired track of a rotating magnetic disk to read and write data to the disk.

In this method, the magnetic head is supported on a tip of an arm of the actuator through a plate-shaped elastic supporter which is referred to as a suspension element. When the disk rotates, the magnetic head is allowed to float with a very small gap above the disk as a result of a balance of floating force of an air fluid generated by rotation of the disk and elastic force of the suspension element against the disk. When the disk stops, the actuator moves the magnetic head to a specified region on the disk so that the magnetic head comes in contact with the disk.

Such a suspension element supporting the magnetic head must contain a plurality of signal wiring lines on the surface for reading and writing data from the magnetic head. In order to manufacture the suspension, therefore, a so-called batch processing method has conventionally been employed in which an insulating layer is formed on a surface of a square metal substrate and a pattern of wiring lines is formed on the insulating layer, that is, the substrate is subjected to various film forming processing steps in a fixed state (for example, see Japanese Unexamined Patent Publications Nos. Hei 6(1994)-215513, Hei 7(1995)-57418, Hei 7(1995)-235156 and Hei 7(1995)-262541).

There exists a rapidly growing demand for high efficiency suspension elements. The batch processing method using a fixed substrate is not a well-suited manufacturing method for mass production of suspension elements. It is preferable that a band-shaped sheet should be used as a substrate and be processed without a break by a manufacturing line in which a plurality of processing sections are continuously arranged from an inlet of the line to an outlet thereof.

In such a manufacturing line, however, the band-shaped sheet is continuous from the inlet of the whole line to the outlet thereof. Therefore, there have been the following problems.

(1) It is necessary to strictly make processing capabilities (speeds) identical with each other in the processing sections.

(2) If a part of the processing sections breaks down, all the processing sections should be stopped for repair. Consequently, a manufacturing efficiency is reduced.

(3) Also in the case where a part of the processing sections becomes defective, the whole sheet is affected so that a yield of products is greatly lowered.

(4) No part of the processing sections can perform a batch processing.

SUMMARY OF THE INVENTION

In consideration of the foregoing, it is an object of the present invention to provide a method for manufacturing a suspension element in which a band-shaped sheet having a predetermined length is fed to a processing section, and the processed substrate is wound and fed to a next processing section, thereby solving the above-mentioned problems.

The present invention provides a method for manufacturing a suspension element for a magnetic head, the suspension element having a pattern of wiring lines on a surface thereof, comprising the steps of: preparing a roll of band-shaped sheet used as a substrate of the suspension element; sequentially performing processes to the sheet through a series of processing sections to integrally form the suspension element with the pattern of wiring lines within a predetermined region of the sheet, and transferring the sheet in a wound state like a roll from one of the processing sections to the next processing section.

DETAILED DESCRIPTION OF THE PREFERRED EMBODIMENT

The band-shaped sheet according to the present invention is made of a thin metal sheet, for example, and may be a sheet of resin, fiber or paper.

The processing sections according to the present invention are devices for performing, on the sheet, processing steps such as formation of various coating films, patterning of the coating films and shaping of the sheet, and are arranged in an order corresponding to the processing steps.

The present invention is characterized in that the band-shaped sheet is wound onto a reel, for example, and is transferred from one of the processing sections to another downstream processing section. That is, according to the present invention, the sheet is wound and is received and sent in a wound state like a roll between the processing sections without being continuously fed. Consequently, it is not necessary to strictly make the processing capabilities (speeds) of the processing sections identical with each other. In addition, even if one of the processing sections breaks down, the other processing section does not need to be stopped. The downstream processing section is not affected by the failure of the upstream processing section. Furthermore, a part of the processing sections can include a processing section for performing a batch processing.

Preferably, the length of the band-shaped sheet according to the present invention is set according to a housing capability of a processing section such as a heating section for housing the wound sheet in a closed chamber and performing a heating step in the chamber.

It is preferable that at least two processing sections have means for winding the processed sheet onto a reel with a tension, in which the tension should be set for each processing section if necessary. In this case, if one of the two processing sections serves to remove unnecessary regions from the sheet, it is naturally preferable that a tension applied to the sheet in that processing section should be set to be less than that of the other processing section.

The tension applied to the sheet during the winding can be set by mounting a cylinder across the band-shape sheet and changing a weight of the cylinder. By mounting the cylinder on the band-shaped sheet as described above, it is possible to prevent wrinkles and slacks or meander of the wound sheet from being generated.

Preferred Embodiments

The present invention will be described in detail based on preferred embodiments with reference to the drawings.

Figure 1:
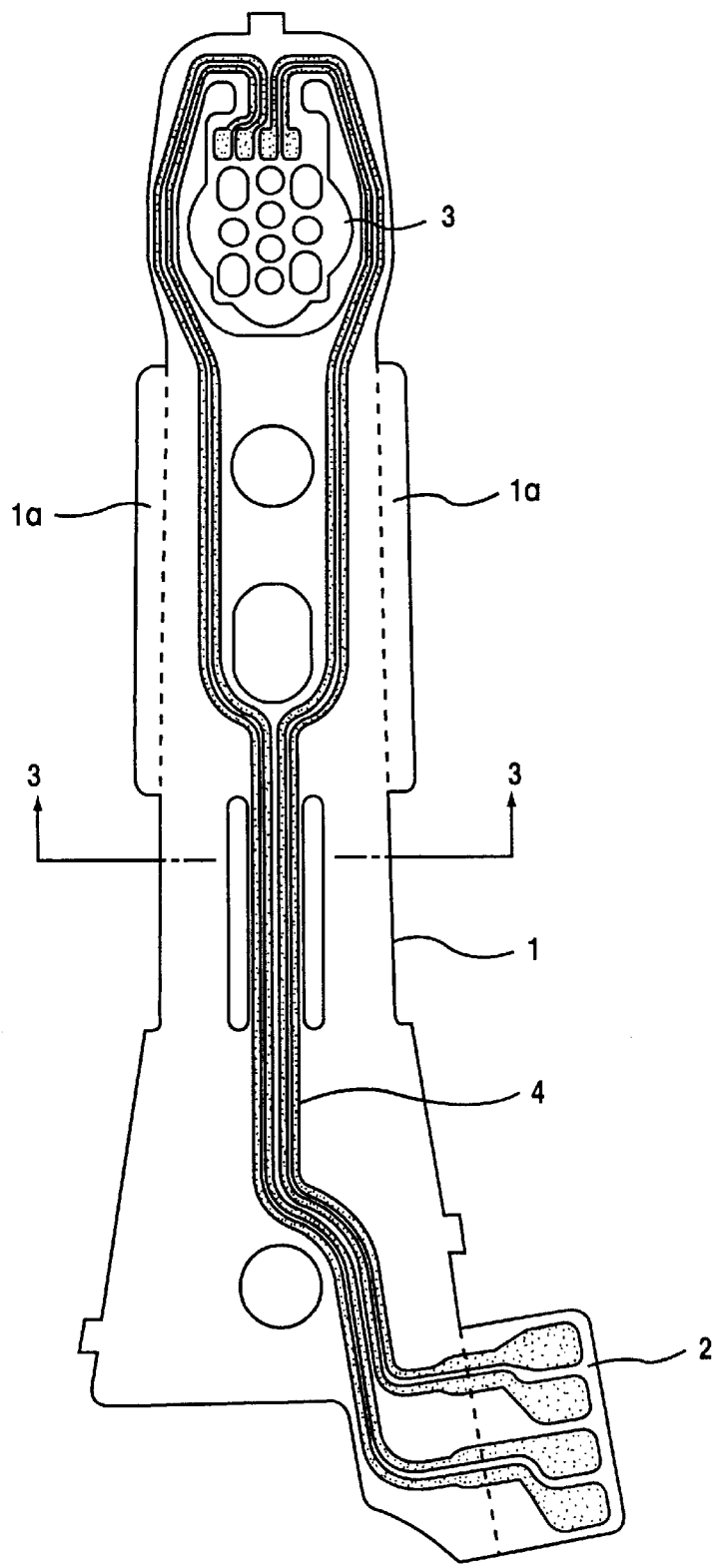
FIG. 1 is a top view showing a suspension manufactured according to an embodiment of the present invention.

(1) Structure of Suspension Element manufactured according to the Preferred Embodiment of the Present Invention FIG. 1 is a top view showing a single body of a suspension element (hereinafter referred to as a suspension) for an MR head manufactured according to the preferred embodiment of the present invention.

As shown in FIG. 1, a suspension 1 comprises a connecting terminal portion 2 provided on one end, a magnetic head mounting portion 3 provided on the other end, and four wiring patterns 4 provided from the portion 2 to the portion 3.

Figure 2:
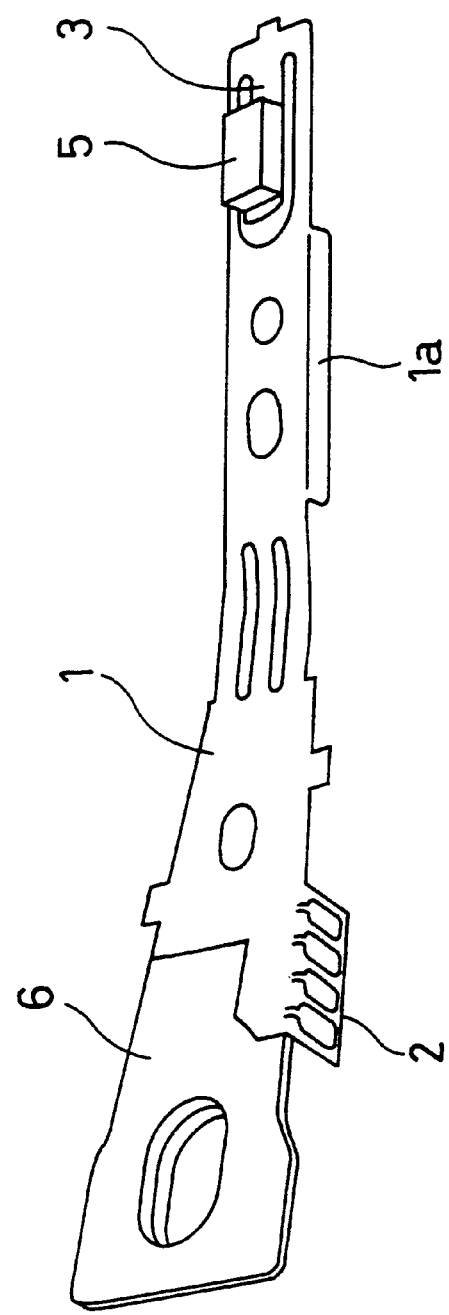
FIG. 2 is a perspective view showing a state in which the suspension according to the embodiment of the present invention is assembled together with a spacer.

The suspension 1 is attached to an actuator of a magnetic disk device in the following manner. Two projections 1a provided on both edges of the suspension 1 and the portion 2 are bent along a broken line (FIG. 1). As shown in FIG. 2, a magnetic head 5 is mounted on the magnetic head mounting portion 3, and (four) signal wiring lines are each pulled up to the connecting terminal portion 2 through the wiring pattern 4. Furthermore, a spacer 6 is attached to the end by laser spot welding.

(2) Process in Sectional Structure of Suspension Element

A process of manufacturing the suspension 1 (FIG. 1) will be described below with reference to FIGS. 3(a) to 3(h) and FIGS. 4(i) to 4(n). FIGS. 3(a) to 3(h) and FIGS. 4(i) to 4(n) show sections taken along the line 3—3 in FIG. 1.

Figure 3A:
FIGS. 3(a) to 3(h) are views showing a manufacturing process, the views showing sections taken along the line 3 shown in FIG. 1.
Figure 3B:
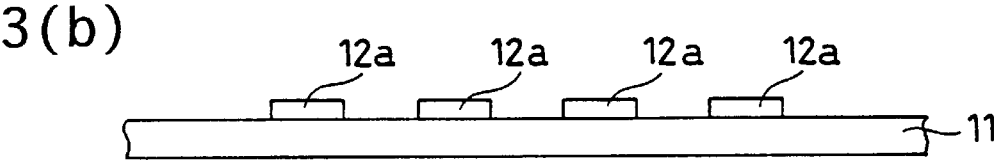

As shown in FIG. 3(a), a photosensitive polyimide resin (UR-3140) 12 is applied in a thickness of 10 to 20 $\mu$m onto a substrate 11 made of stainless steel sheet (SUS304TA) having a thickness of 25 $\mu$m which has been washed, and an exposing processing step and a prebaking processing step are performed. Then, a developing processing and a postbaking processing are performed. Consequently, a lower insulating layer 12a is formed as shown in FIG. 3(b).

Figure 3C:
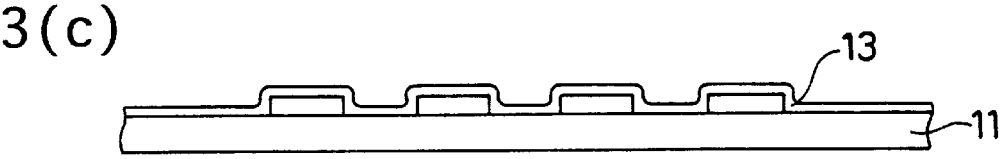
Figure 3D:
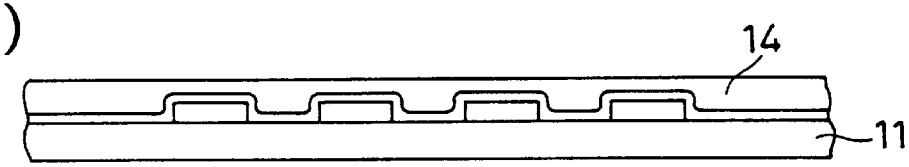

As shown in FIG. 3(c), a Cr layer having a thickness of 500 Å to 1000 Å and a Cu layer having a thickness of 1000 Å to 2000 Å are formed by sputtering to form a plating base 13. A photosensitive resist film 14 is formed on the plating base 13 as shown in FIG. 3(d).

Figure 3E:
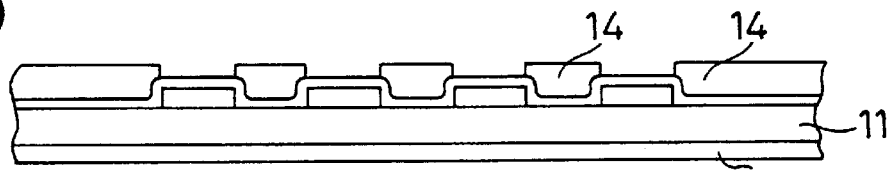
Figure 3F:
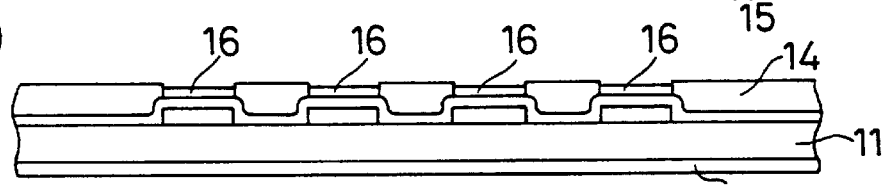

As shown in FIG. 3(e), the resist film 14 is subjected to exposing and developing processings. Then, a resist film 15 is formed on the back of the substrate 11. Thereafter, Cu, Ni and Au plating processings are sequentially performed to form a wiring layer 16 comprising a Cu layer having a thickness of 1 to 6 $\mu$m, a Ni layer having a thickness of 0.7 to 1 $\mu$m, and a Au layer having a thickness of 1.0 $\mu$m as shown in FIG. 3(f).

Figure 3G:
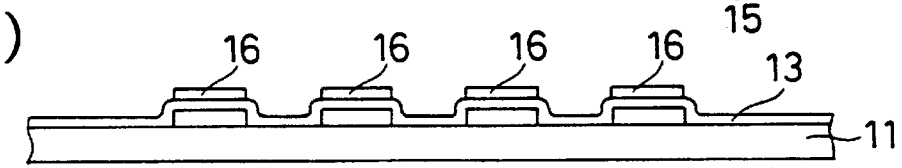
Figure 3H:
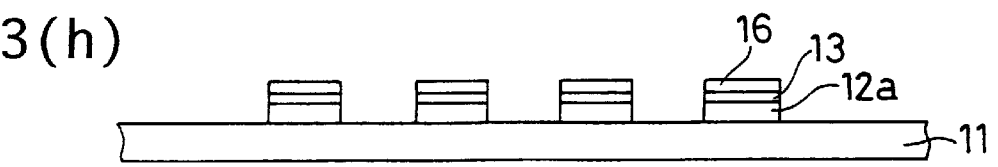

Subsequently, the resist films 14 and 15 are removed as shown in FIG. 3(g). Then, the unnecessary plating base 13 is removed by an etching processing as shown in FIG. 3(h).

Figure 4I:
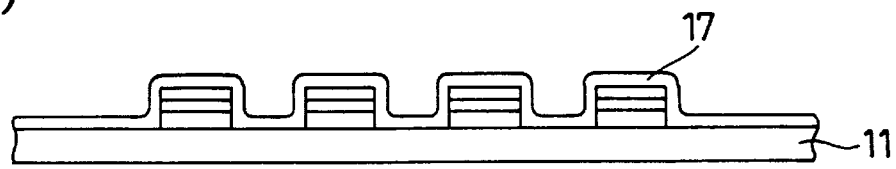
FIGS. 4(i) to 4(n) are views showing the manufacturing process, the views showing sections taken along the line 3 shown in FIG. 1.
Figure 4J:
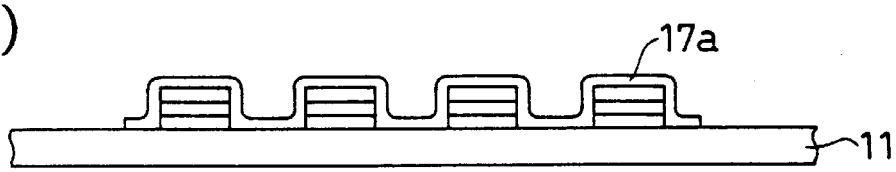

As shown in FIG. 4(i), a photosensitive polyimide resin 17 is applied in a thickness of 1 $\mu$m, and exposing and prebaking processings are performed. Then, developing and postbaking processings are performed. Thus, a protective film 17a is formed only in a necessary portion as shown in FIG. 4(j).

Figure 4K:
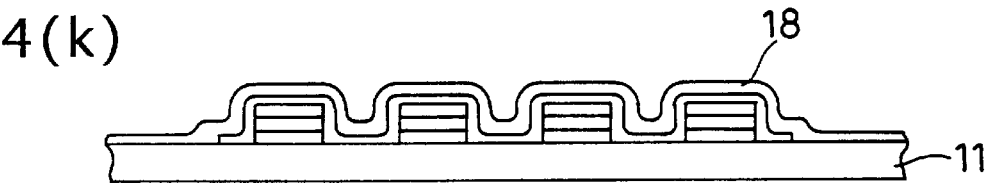
Figure 4L:
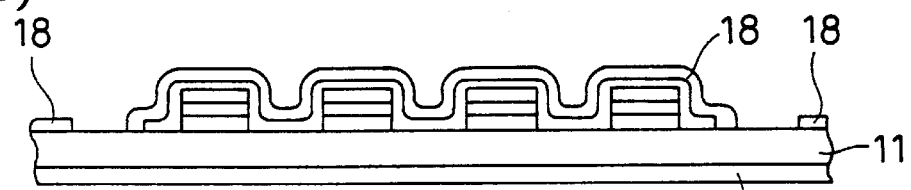

After a washing processing is performed, a photosensitive resist film 18 is formed as shown in FIG. 4(k). Then, the resist film 18 is subjected to exposing and developing processings and a resist film 19 is formed on the back of the substrate 11 as shown in FIG. 4(l).

Figure 4M:
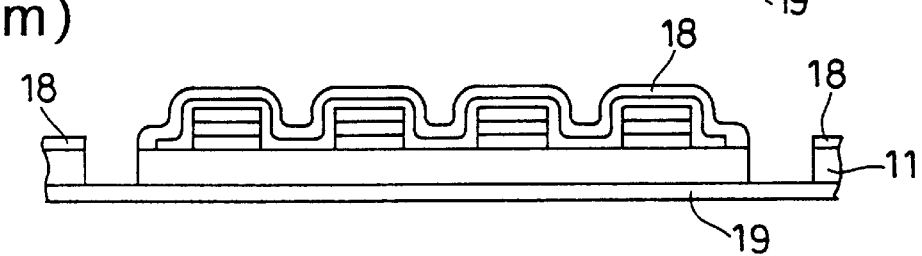
Figure 4N:
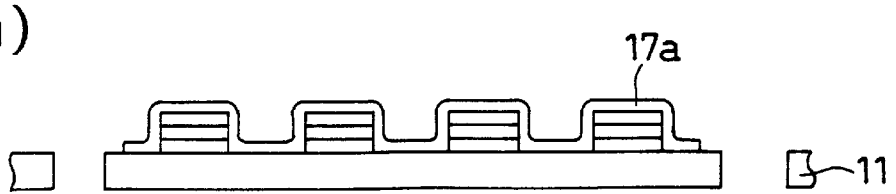

Next, an unnecessary portion of the substrate 11 is removed by an etching processing as shown in FIG. 4(m). Then, the resist films 18 and 19 are removed. Consequently, a suspension shown in FIG. 4(n) is finished. Thus, the process is completed.

(3) Mass-producing Equipment of Suspension Element

An equipment for mass-producing the suspension to be manufactured as described above and operation thereof will be described below.

Figure 5:
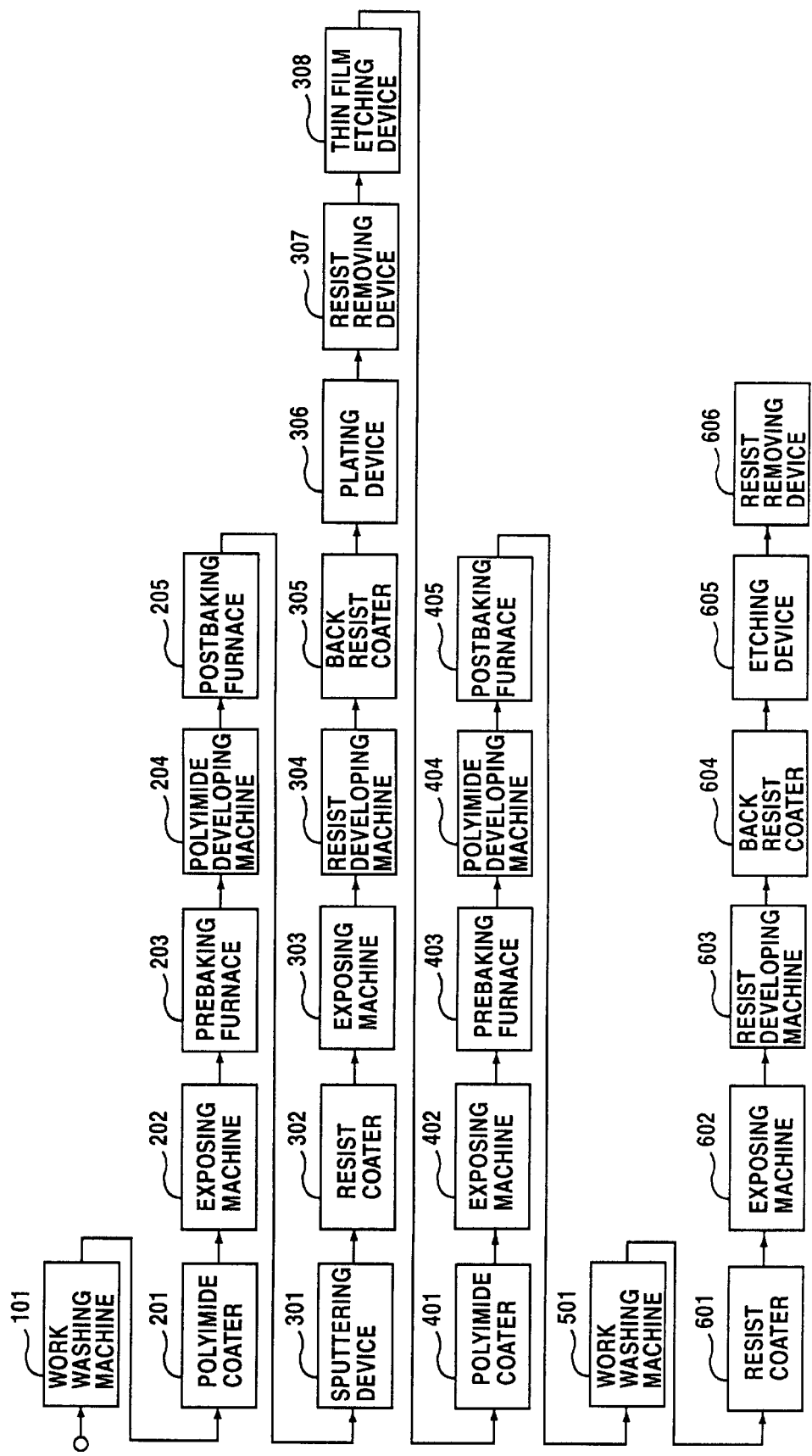
FIG. 5 is a layout diagram showing a manufacturing equipment according to the embodiment of the present invention.
Figure 6:
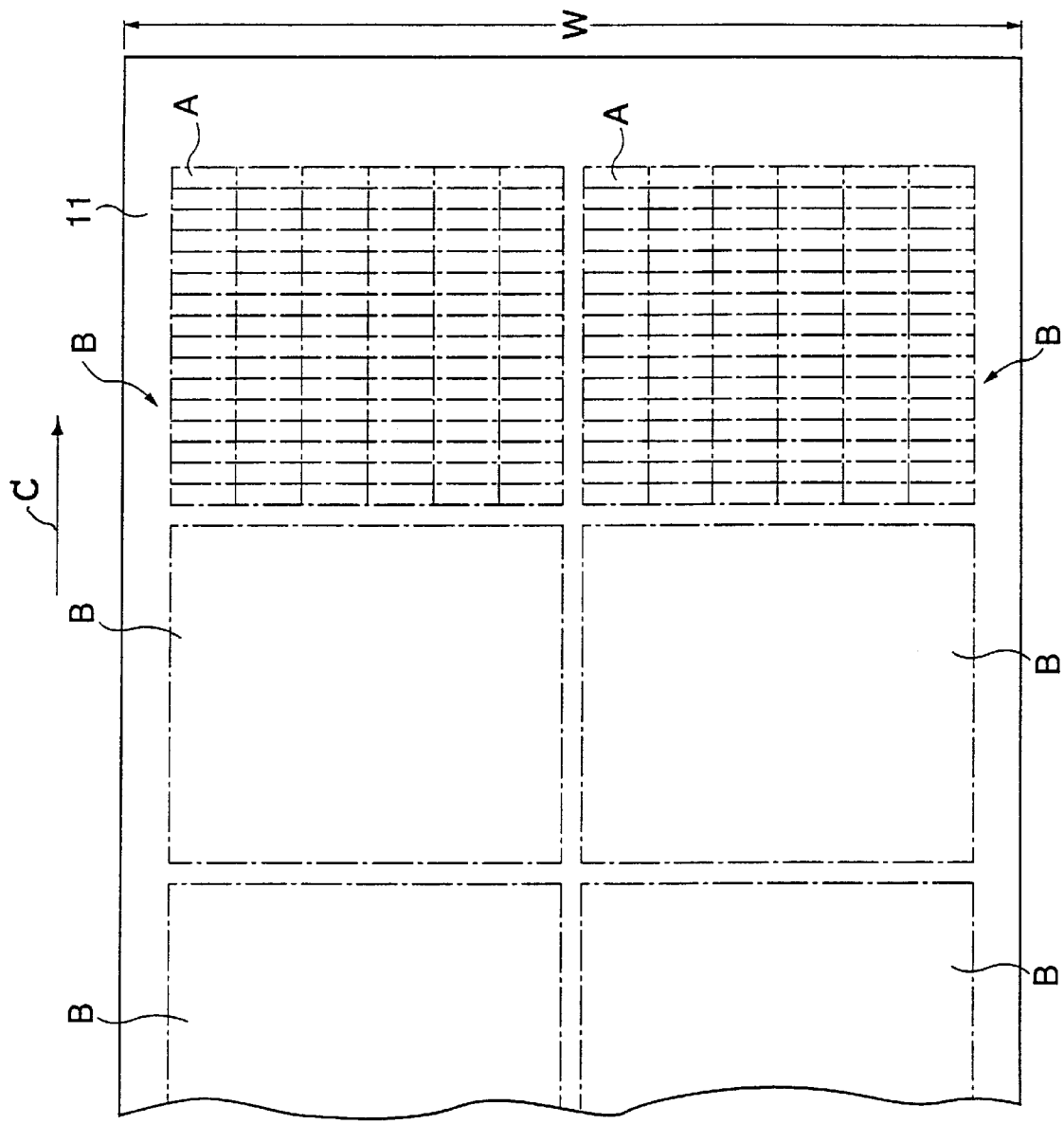
FIG. 6 is a top view showing a substrate to be processed by the manufacturing equipment according to the embodiment of the present invention.
Figure 7:
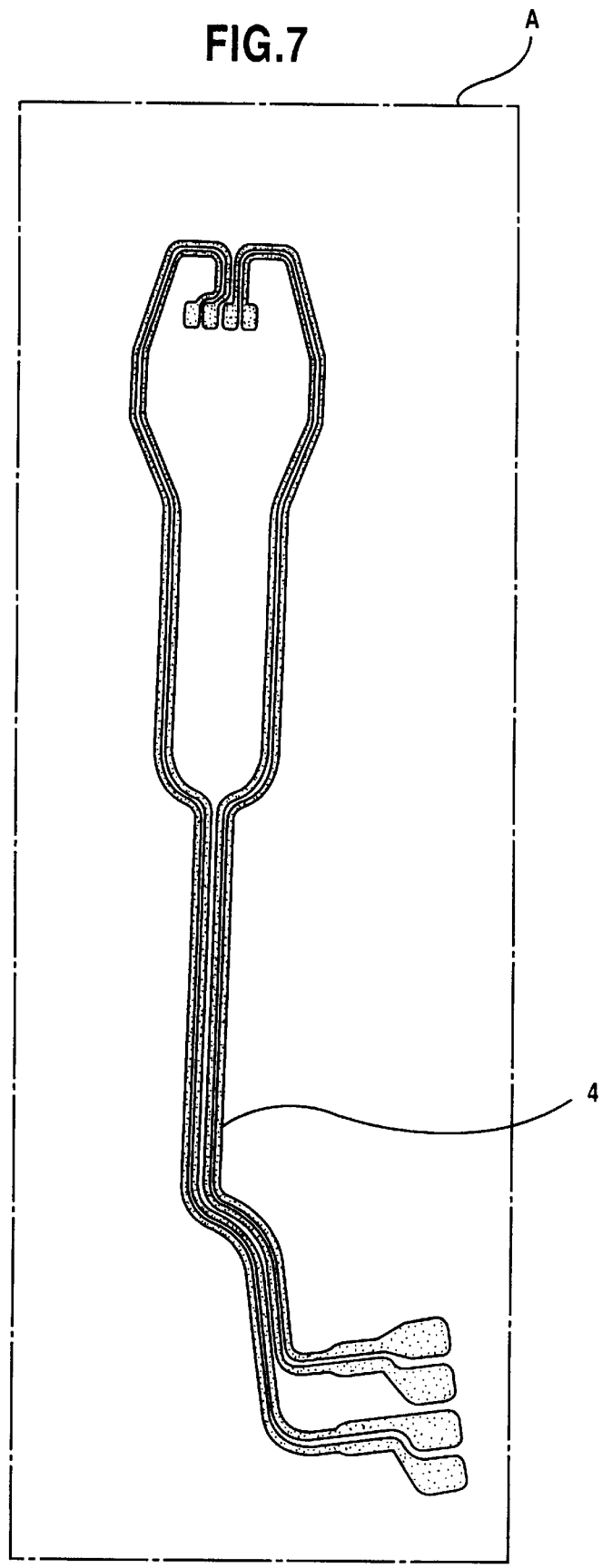
FIG. 7 is a top view showing a wiring pattern formed on the substrate according to the embodiment of the present invention.
Figure 8:
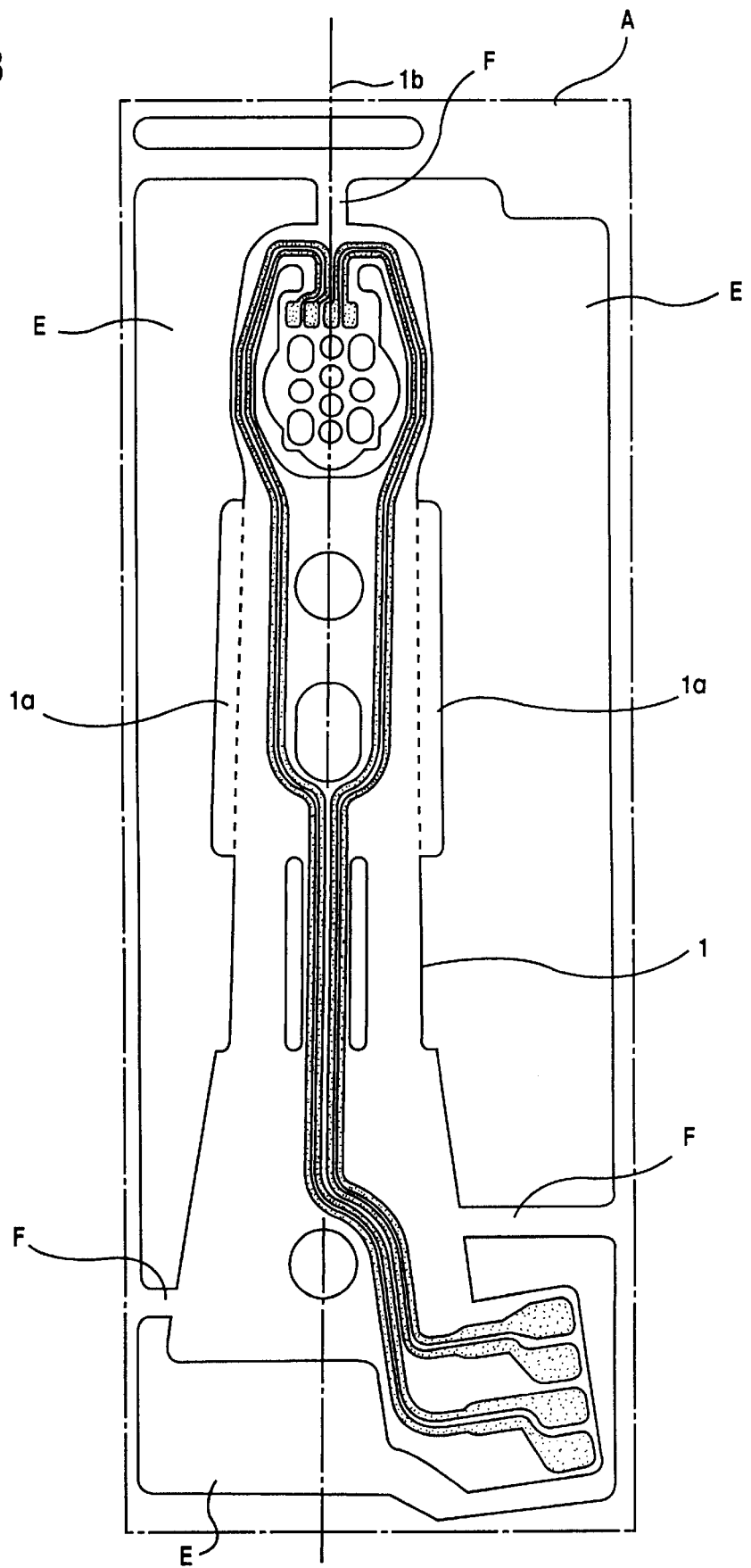
FIG. 8 is a top view showing a suspension which is partitioned on the substrate according to the embodiment of the present invention.

FIG. 5 is a diagram showing a layout for the manufacturing equipment. FIG. 6 is a partial top view showing a substrate to be used. FIG. 7 is a top view showing a wiring pattern formed on the substrate. FIG. 8 is a top view showing a suspension partitioned on the substrate. The substrate referred to as a work member is made of a band-shaped stainless steel sheet (SUS304TA) having a width W of 250 mm, a length of 120 m and a thickness of 25 $\mu$m. In this equipment, the substrate is fed in a direction of an arrow C, the suspension is partitioned into 96 regions A in 6 rows and 16 columns included in a region B, and the region B is arranged in two rows in a longitudinal direction of the substrate. As shown in FIG. 7, a wiring pattern of the suspension having a longitudinal axis is arranged in each region A in such a direction that an axis thereof is orthogonal to a winding direction of the work member (the direction of the arrow C). This arrangement is required to prevent the wiring pattern from being extended and broken when the substrate is wound. As shown in FIG. 8, two projections 1*a* provided on both edges of the suspension 1 having a longitudinal axis are arranged in each region A in a direction orthogonal to a winding direction of the work member. In other words, a curl direction generated by winding the work member is allowed to be identical to a bending direction of the projection 1*a* of the suspension 1.

By employing such a layout, the projection 1*a* of the suspension thus formed can be bent with high precision along a broken-line portion shown in FIG. 1. The length of the substrate (120 m) is determined by a housing capability of a postbaking furnace 205 which will be described below.

In FIG. 5, when a feeding reel onto which the substrate having a length of 120 m is wound is attached to a washing section, that is, a work washing machine 101, the work washing machine 101 washes the substrate with a weak alkaline degreasing solution while pulling the substrate out of the feeding reel and continuously feeding the substrate by means of a plurality of rolls at a constant speed of 1 m/min. and allows the substrate to be wound by another winding reel.

When the reel which has wound the substrate in the work washing machine 101 is transferred and mounted to a coating section, that is, a polyimide coater 201, the polyimide coater 201 coats the substrate with a photosensitive polyimide resin and dries the coated substrate while pulling the substrate out of the reel and continuously feeding the substrate by means of rolls at a constant speed of 0.75 to 1 m/min. and allows the substrate to be wound by another winding reel.

When the reel which has wound the substrate in the polyimide coater 201 is transferred and mounted to an exposing section, that is, an exposing machine 202, the exposing machine 202 performs an exposing processing for patterning a lower insulating layer by means of a mercury lamp every four regions B having 2 rows and 2 columns while pulling the substrate out of the reel and intermittently feeding the substrate by means of the rolls at an average speed of 0.5 m/min., and allows the substrate to be wound by another winding reel.

When the reel which has wound the substrate in the exposing machine 202 is transferred and mounted to a prebaking section, that is, a prebaking furnace 203, the prebaking furnace 203 heats an exposed section at a temperature of 150 to 170° C. for forming an imido compound while pulling the substrate out of the reel and continuously feeding the substrate by means of rolls at a constant speed of 0.5 to 1 m/min. and allows the substrate to be wound by another winding reel.

When the reel which has wound the substrate in the prebaking furnace 203 is transferred and mounted to a developing section, that is, a polyimide developing machine 204, the polyimide developing machine 204 immerses the substrate in an alkaline developing solution reservoir to dissolve an unexposed portion of a polyimide layer while pulling the substrate out of the reel and continuously feeding the substrate by means of the rolls at a constant speed of 1 m/min., and allows the substrate to be wound by another winding reel.

When the reel which has wound the substrate in the polyimide developing machine 204 is transferred and mounted to a closed chamber of a heating section, that is, a postbaking furnace 205, the postbaking furnace 205 performs main baking by burning the substrate at 350 to 400° C. according to a so-called batch processing, thereby perfectly forming imido groups in the exposed portion. Thus, the steps shown in FIGS. 3(*a*) and 3(*b*) are completed.

Then, the reel having the substrate which has been processed by the postbaking furnace 205 is transferred and mounted to a vacuum evaporating section, that is, a closed vacuum chamber of a sputtering device 301. Consequently, the sputtering device 301 sputters the substrate every four regions B having 2 rows and 2 columns while pulling the substrate out of the reel and intermittently feeding the substrate by means of the rolls at an average speed of 0.6 m/min., and forms a Cr layer having a thickness of 500 to 1000 Å and a Cu layer having a thickness of 1000 to 2000 Å (see FIG. 3(*c*)) and allows another winding reel to wind the substrate.

When the reel which has wound the substrate in the sputtering device 301 is transferred and mounted to a coating section, that is, a resist coater 302, the resist coater 302 coats the substrate with a photosensitive resist and dries the coated substrate while pulling the substrate out of the reel and continuously feeding the substrate by means of rolls at a constant speed of 1 m/min. (see FIG. 3(*d*)), and allows another winding reel to wind the substrate.

When the reel which has wound the substrate in the resist coater 302 is transferred and mounted to an exposing section, that is, an exposing machine 303, the exposing machine 303 performs an exposing processing for patterning a wiring layer by means of a mercury lamp every four regions B having 2 rows and 2 columns while pulling the substrate out of the reel and intermittently feeding the substrate by means of rolls at an average speed of 0.2 m/min., and allows another winding reel to wind the substrate.

When the reel which has wound the substrate in the exposing machine 303 is transferred and mounted to a developing section, that is, a resist developing machine 304, the resist developing machine 304 immerses the substrate in an alkaline developing solution reservoir to dissolve an exposed portion of the resist while pulling the substrate out of the reel and continuously feeding the substrate by means of rolls at a constant speed of 0.6 to 1 m/min., and allows another winding reel to wind the substrate.

When the reel which has wound the substrate in the resist developing machine 304 is transferred and mounted to a coating section, that is, a back resist coater 305, the back resist coater 305 coats a back of the substrate with a resist while pulling the substrate out of the reel and continuously feeding the substrate by means of rolls at a constant speed of 0.7 to 1 m/min. (see FIG. 3(*e*)), reverses top and bottom faces of the substate and allows another winding reel to wind the substrate. By reversing the top and bottom faces, a curl is removed and the substrate is advantageously wound.

When the reel which has wound the substrate in the back resist coater 305 is transferred and mounted to a plating section, that is, a plating device 306, the plating device 306 immerses the substrate in each of the plating reservoirs for copper sulfate, nickel chloride and Au solutions while pulling the substrate out of the reel and continuously feeding the substrate by means of rolls at a constant speed of 0.5 to 1 m/min. Thus, the substrate is sequentially subjected to Cu, Ni and Au plating processings (see FIG. 3(*f*)). Then, the plated substrate is wound onto another winding reel.

When the reel which has wound the substrate in the plating device 306 is transferred and mounted to a resist processing section, that is, a resist removing device 307, the resist removing device 307 immerses the substrate in an alkaline processing solution reservoir while pulling the substrate out of the reel and continuously feeding the substrate by means of rolls at a constant speed of 1 m/min., thereby removing the resist. After the substrate is subjected to a spray washing processing (see FIG. 3(g)), it is wound onto another winding reel.

When the reel which has wound the substrate in the resist removing device 307 is transferred and mounted to an etching section, that is, a thin film etching device 308, the thin film etching device 308 sequentially immerses the substrate in each of the processing solution reservoirs for an acid processing solution and an alkaline processing solution while pulling the substrate out of the reel and continuously feeding the substrate by means of rolls at a constant speed of 0.5 to 1 m/min. Then, an etching processing is performed to remove a plating base (see FIG. 3(h)) to allow another winding reel to wind the substrate. By these steps, a wiring pattern 4 shown in FIG. 7 is formed in each region A shown in FIG. 6.

Then, the substrate wound onto the reel in the thin film etching device 308 is sequentially processed by a series of processing sections, that is, a polyimide coater 401, an exposing machine 402, a prebaking furnace 403, a polyimide developing machine 404 and a postbaking furnace 405. Consequently, a protective film is formed (see FIGS. 4(i) and 4(j)). The contents of the processings are the same as in the polyimide coater 201, the exposing machine 202, the prebaking furnace 203, the polyimide developing machine 204 and the postbaking furnace 205, respectively.

The substrate having the protective film formed thereon is processed by another series of processing sections, that is, a work washing machine 501, a resist coater 601, an exposing machine 602, a resist developing machine 603 and a back resist coater 604 (see FIGS. 4(k) and 4(l)). The contents of the processings are the same as in the work washing machine 101, the resist coater 302, the exposing machine 303, the resist developing machine 304 and the back resist coater 305, respectively.

When the reel which has wound the substrate processed in the back resist coater 604 is transferred and mounted to an etching section, that is, an etching device 605, the etching device 605 performs a spray etching processing with an acid processing solution while pulling the substrate out of the reel and continuously feeding the substrate by means of rolls at a constant speed of 0.7 to 1 m/min., thereby shaping an outline of the suspension (see FIG. 4(m)). Thus, the substrate is wound onto another winding reel.

When the reel which has wound the substrate in the etching device 605 is transferred and mounted to a resist processing section, that is, a resist removing device 606, the resist removing device 606 performs the same processing as that of the resist removing device 307 (see FIG. 4(n)).

By the above-mentioned steps, the suspension 1 is formed in all the regions A shown in FIG. 6 with a peripheral pattern E removed and held on the substrate 11 by connecting portions F as shown in FIG. 8. The two projections 1a provided on both edges of the suspension 1 having the longitudinal axis 1b are arranged in the direction orthogonal to the winding (longitudinal) direction of the substrate 11. In other words, the suspension 1 is partitioned in such a manner that the curl generated by winding the substrate 11 and the bent portion (broken line) of the projection 1a of the suspension 1 have in the same direction.

Thus wound onto the reel, the substrate is received and sent between the downstream processing sections. In each processing section, a processing is performed. Finally, 1000 suspensions are manufactured per meter. Each arrow shown in FIG. 5 indicates a direction of receiving and sending the substrate, and that of flow of the processing. Between the processing sections, the reel onto which the substrate is wound may be transferred, automatically by means of a device such as a robot or manually by an operator.

(4) Characteristic of Main Part of Manufacturing Equipment

Characteristics of a main processing section of the manufacturing equipment shown in FIG. 5 will be described below.

Figure 9:
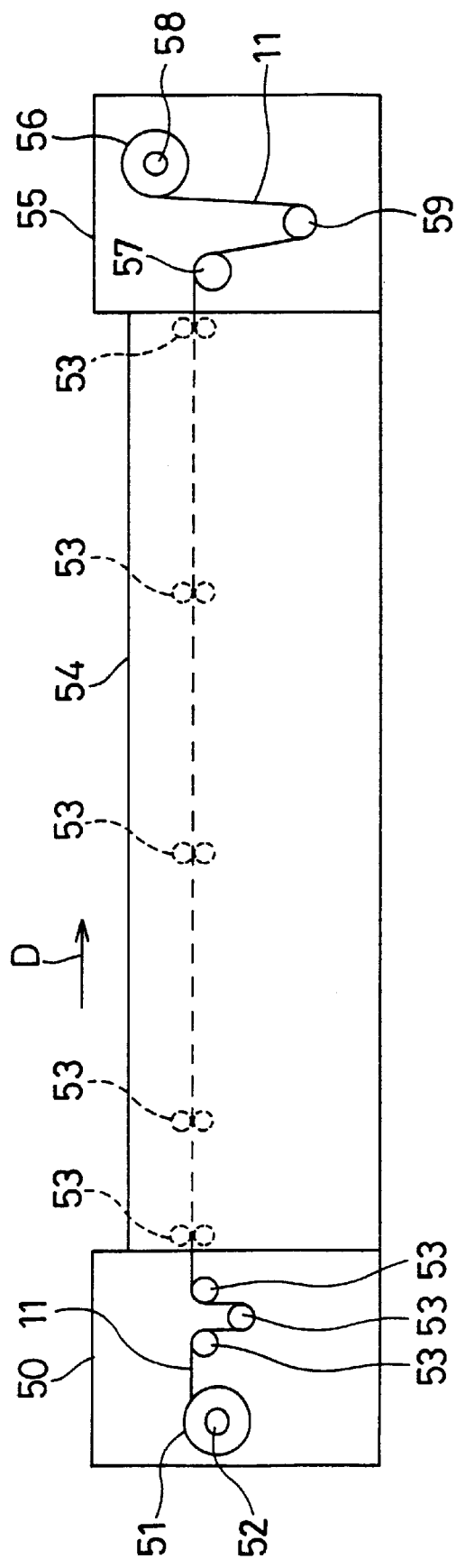
FIG. 9 is a view showing an example of a structure of a processing section of the manufacturing equipment according to the embodiment of the present invention.

FIG. 9 is a view showing a structure common to each processing section shown in FIG. 5 (excluding the exposing machines 202, 303 and 402, the postbaking furnaces 205 and 405, and the sputtering device 301), in which the substrate 11 has a guide sheet, for example, a Teflon sheet (not shown) having a predetermined length connected to a front end thereof. When a reel 51 onto which the substrate 11 is wound is mounted to a reel shaft 52 of a feeding mechanism 50, the guide sheet connected to the end of the substrate 11 is pulled out of the reel 51 and is fed in a direction of an arrow D by a plurality of rolls 53 and wound onto a winding reel 56. When a position of the first suspension 1 to be formed on the substrate 11 is allowed to reach a predetermined position of a processing chamber 54, a processing is started. After the processing is performed for the substrate 11 in the processing chamber 54, the substrate 11 1 is wound onto the winding reel 56 of a winding mechanism 55.

Figure 10:
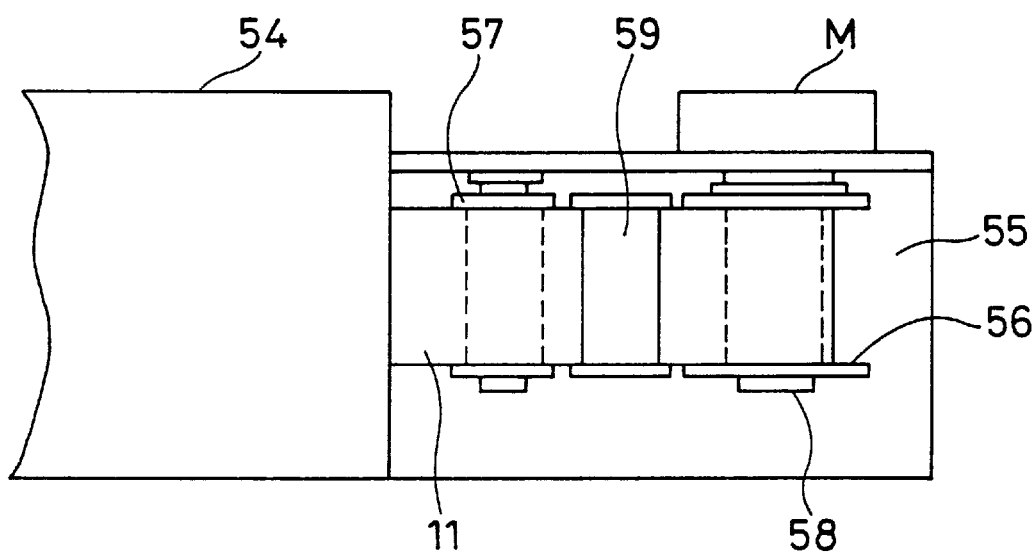
FIG. 10 is a top view showing a main part of a processing section according to the embodiment of the present invention.
Figure 11:
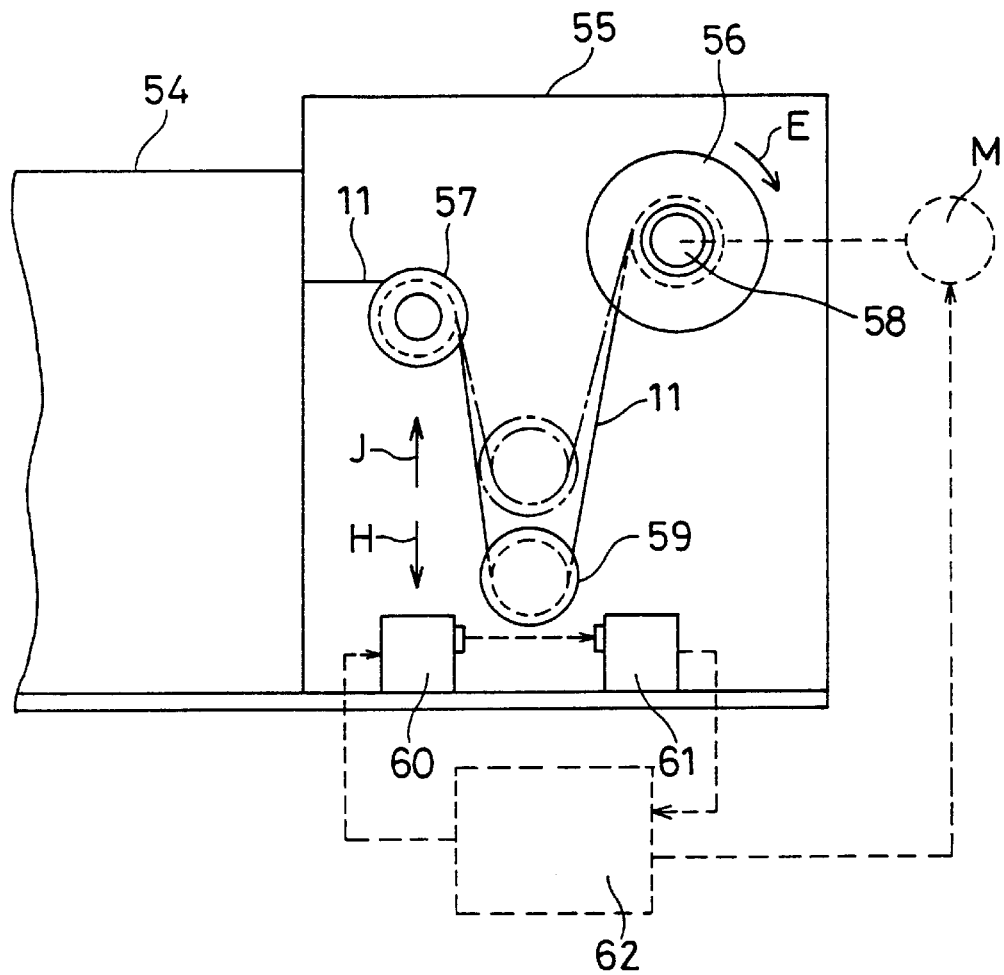
FIG. 11 is a side view showing the main part of the processing section according to the embodiment of the present invention.

FIGS. 10 and 11 are top and side views showing the details of the winding mechanism 55. The substrate 11 discharged from the processing chamber 54 is supported by a driven roll 57, and is wound by the winding reel 56 mounted to a driving reel shaft 58. A cylindrical roll 59 is mounted on the substrate 11 from the roll 57 to the winding reel 56 in a direction in which an axis thereof traverses the substrate 11.

Accordingly, when the substrate 11 is sent from the processing chamber 54 at a constant speed, the roll 59 goes downward by itself in a direction of an arrow H. When a lower end of the roll 59 is detected by an optical sensor having a light emitting element 60 and a light receiving element 61, a motor controller 62 drives the driving reel shaft 58 by means of a motor M. Consequently, the reel 56 is rotated in a direction of an arrow E to wind the substrate 11 at a higher speed than a discharge speed of the processing chamber 54. As a result, the roll 59 goes upward in a direction of an arrow J.

When a predetermined time passes and the motor control section 62 stops the motor M, the roll 59 goes downward again in the direction of the arrow H. By repeating this operation, the winding reel 56 winds the substrate 11. When the substrate 11 is thus wound, the shaft of the roll 59 can be freely slanted along a face of the substrate 11. Therefore, a tension uniformly distributed in a lateral direction of the substrate 11 can be applied to the winding reel 56 by itself. Consequently, the substrate 11 is wound without generating wrinkles and corrugations.

At this time, a winding tension can be set on the basis of a weight of the roll 59. Therefore, the winding tension is set for each processing section if necessary. In particular, in the etching device 605 and the resist removing device 606, the winding tension is set smaller than that of any other processing section, since unnecessary portions have been removed from the substrate 11 and the substrate 11 can be easily deformed by the tension.

Also in each processing chamber 54 of the etching device 605 and the resist removing device 606, the tension applied to the substrate by the rolls 53 is set smaller than a tension applied in each processing chamber 54 of the preceding processing device.

Figure 12:
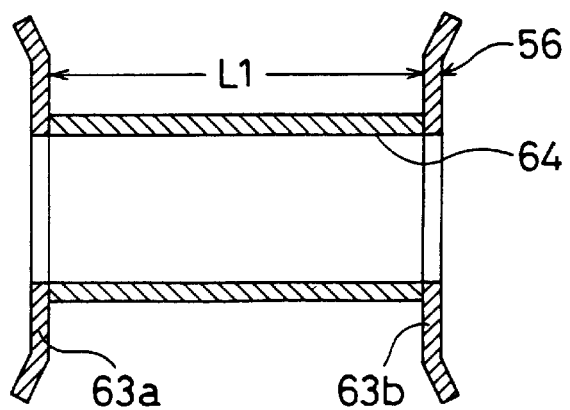
FIG. 12 is a sectional view showing a reel used for the embodiment of the present invention.

As shown in a cross-section of FIG. 12, the reel 56 includes a winding shaft 64 and flanges 63a and 63b provided on both ends thereof opposite one another. The internal distance L1 between the flanges 63a and 63b increases according to the radial distance away from the winding shaft 64. The reason is that inner surfaces of the flanges 63a and 63b function as guides when the substrate 11 is wound onto the reel 56 so that a winding work can easily be performed.

Figure 13:
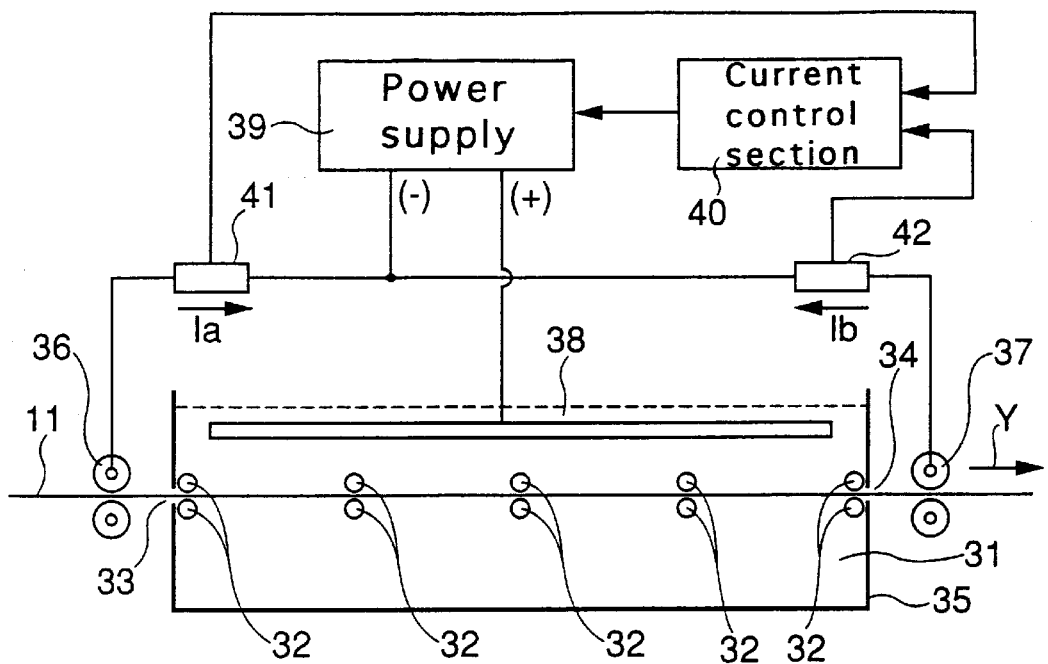
FIG. 13 is a view for explaining a structure of a main part of a plating device according to the embodiment of the present invention.

FIG. 13 is a diagram showing a structure of a main part of the plating device 306. As described above, the front end of the substrate 11 is connected with the guide sheet. In a plating reservoir 35, the substrate 11 inserted from an inlet 33 is continuously fed horizontally by rolls 32 at a constant speed while it is being immersed in a plating solution 31, and is discharged from an outlet 34 in a direction of an arrow Y. In order to apply a feed power to the substrate 11, first and second feeding rolls 36 and 37 are provided on inlet and outlet sides of an outside of the plating reservoir 35, respectively. Furthermore, a plating electrode 38 is provided on an inside of the plating solution 31 of the plating reservoir 35. In addition, the first and second feeding rolls 36 and 37 are formed of an electric conductor and connected to a negative electrode of a plating power supply 39, and the plating electrode 38 is connected to a positive electrode of the plating power supply 39.

By detecting a plating current Ia flowing through the first feeding roll 36 by means of a current detector 41 and a plating current Ib flowing through the second feeding roll 37 by means of a current detector 42, a current control section 40 can control an output current of the power supply 39.

Figure 14:
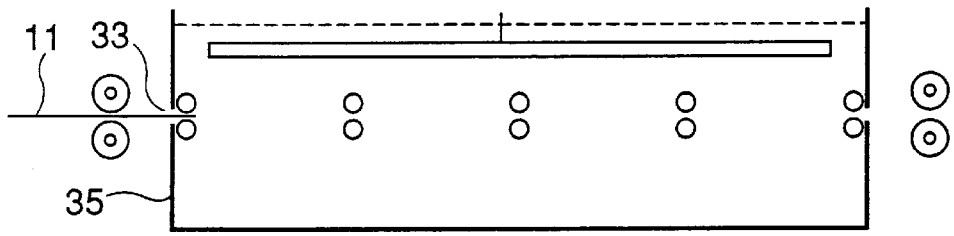
FIG. 14 is a view for explaining operation of the plating device according to the embodiment of the present invention.
Figure 15:
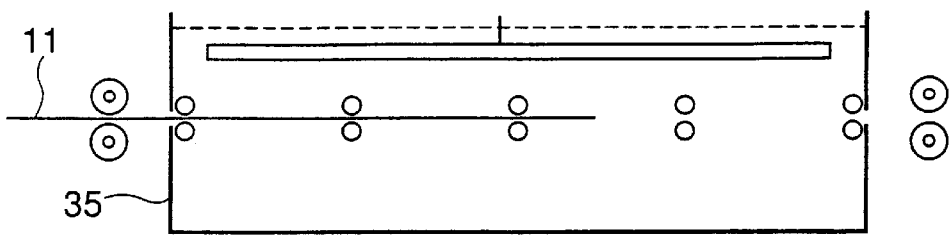
FIG. 15 is a view for explaining the operation of the plating device according to the embodiment of the present invention.
Figure 16:
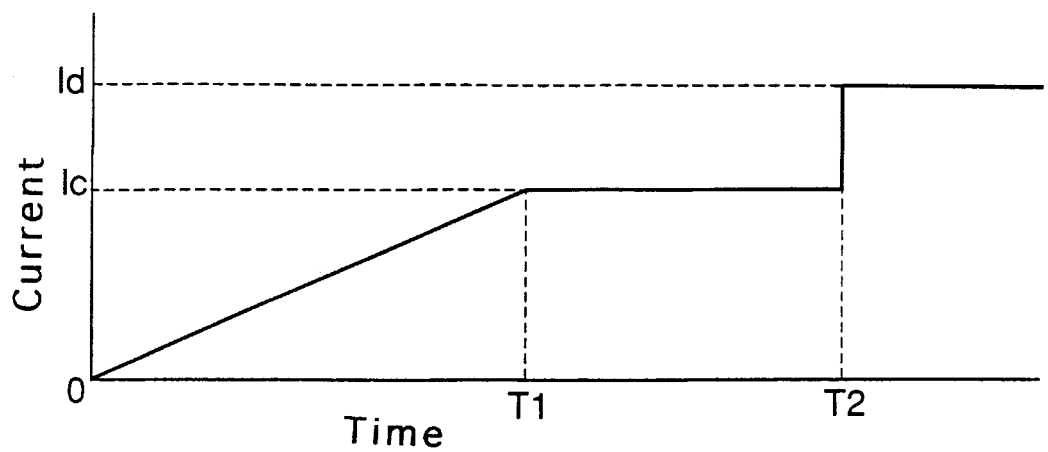
FIG. 16 is a graph showing the operation of the plating device according to the embodiment of the present invention.

With such a structure, if the front end of the substrate 11 is inserted into the inlet 33 of the plating reservoir 35 shown in FIG. 14, the current Ia starts to flow. When the current Ia is detected by the current detector 41, the current control section 40 gradually increases the current Ia until a time T1 passes after the insertion of the substrate 11 as shown in FIG. 16 and the substrate 11 reaches an intermediate position shown in FIG. 15. After reaching a maximum value Ic (for example, 7A) within a current range in which Cr and Cu layers (plating bases) that have been formed on a surface of the substrate 11 by the sputtering device 301 are not broken with an overcurrent, the current Ia is held at Ic.

When the current detector 42 detects that a time T2 passes after the insertion of the substrate and the front end of the substrate 11 reaches the second feeding roll 37, the current control section 40 immediately controls the output current of the power supply 39 such that Ia+Ib=Id (>Ic) is constant. After that, the relationship of Ia+Ib=Id (for example, 10A) is maintained to form a plating layer on the substrate 11. Consequently, the substrate 11 can be subjected to plating processing without breaking the previously formed plating base. In addition, by the plating processing, uniform plating is achieved at about a double speed as compared with a case in which the substrate 11 is plated by either the feeding roll 36 or 37.

(5) Variant of Layout of Manufacturing Equipment

A variant of the embodiment shown in FIG. 5 will be described below with reference to FIG. 17.

Figure 17:
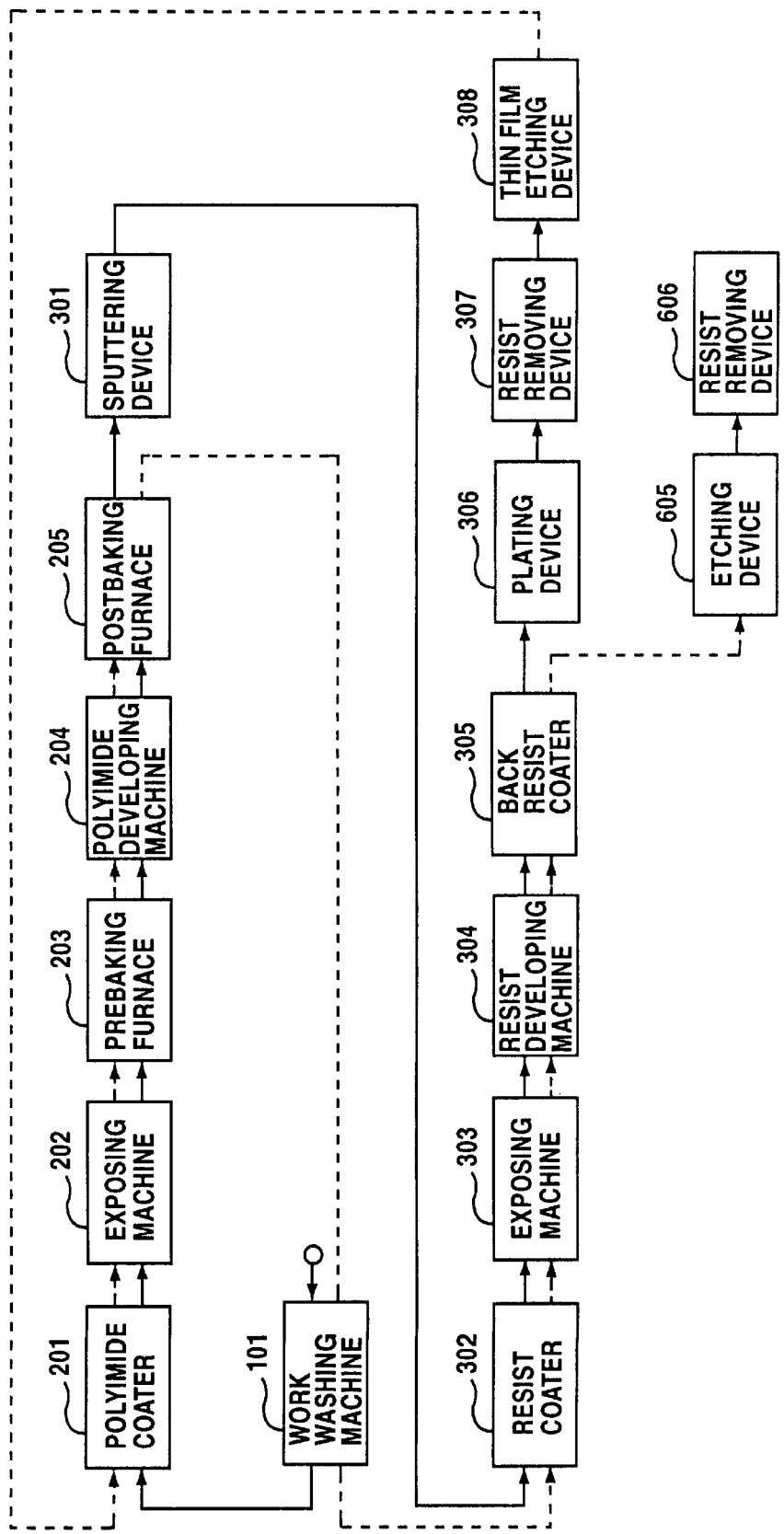
FIG. 17 is a layout diagram showing a variant of the manufacturing equipment according to the embodiment of the present invention.

FIG. 17 shows an example in which processing sections capable of being used in common are shared to decrease the number of the processing sections in the layout shown in FIG. 5. In a series of processing sections for forming a polyimide layer, the polyimide coater 201, the exposing machine 202, the prebaking furnace 203, the polyimide developing machine 204 and the postbaking furnace 205 are used as the polyimide coater 401, the exposing machine 402, the prebaking furnace 403, the polyimide developing machine 404 and the postbaking furnace 405, espectively. In a series of processing sections for forming a resist layer, the resist coater 302, the exposing machine 303, the resist developing machine 304 and the back resist coater 305 are used as the resist coater 601, the exposing machine 602, the resist developing machine 603 and the back resist coater 604, respectively.

In FIG. 17, each processing section is arranged in such a manner that a processing step first proceeds from the polyimide coater 201 to the thin film etching device 308 in accordance with an arrow shown by a solid line, and then proceeds to the final resist removing device 606 in accordance with an arrow shown by a broken line. In this case, if each processing section which is shared is allowed to perform a processing at a speed which is about twice as much as that of any other processing section, the whole processing steps can smoothly be performed without tie-up. In at least one processing section, the substrate is wound inside out so that a curl may be removed.

According to the present invention, the following effects can be obtained by the manufacturing equipment in which a band-shaped sheet is processed by a plurality of processing sections in a defined order.

(1) A series of processings can be performed even if the processing capabilities of the processing sections are different from each other.

(2) It is not necessary to stop the whole processing sections even if a part of the processing sections breaks down.

(3) Even if defects are generated in one processing section, sheets in the other processing sections are not affected. Therefore, the yield can be enhanced.

(4) Some of the processing sections can include a batch processing section.

(5) A layout can be employed such that the same kind of processing sections are used in common.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A method for manufacturing a suspension element for a magnetic head, comprising the steps of:

processing and winding a band-shaped sheet in a roll shape for use as a substrate of the suspension element;

sequentially performing processes to the sheet through a series of processing sections to integrally form the suspension element with a pattern of wiring lines on a surface thereof within a predetermined region of the sheet; and transferring the sheet in a wound state from one of the processing sections to the next processing section, wherein the suspension element has an elongated shape with a longitudinal axis, the wiring lines are arranged substantially traverse to the longitudinal axis, and the suspension element is formed through the processing sections so that the longitudinal axis extends lengthwise of band-shaped sheet in the same direction as the winding direction of the band-shaped sheet.

2. The method according to claim 1, wherein an edge of the suspension element has an elongated bent portion substantially parallel to the longitudinal axis.

3. The method according to claim 1, wherein at least one of the processing sections rewinds inside out the sheet after completing a necessary process for the sheet in the one of the processing sections.

4. The method according to claim 1, wherein the processing sections includes an upstream processing section which serves to apply a tension to the sheet and remove a peripheral portion of the suspension element from the sheet except for a portion for retaining the suspension element and a downstream processing section which serves to perform a necessary process by setting a tension applied to the sheet to be smaller than that of the upstream processing sections.

* * * * *

UNITED STATES PATENT AND TRADEMARK OFFICE
CERTIFICATE OF CORRECTION

PATENT NO.   : 6,106,688
DATED        : August 22, 2000
INVENTOR(S)  : Miyazazki et al.

It is certified that error appears in the above-identified patent and that said Letters Patent is hereby corrected as shown below:

Column 10,
Line 60, change "traverse" to be -- parallel --
Lines 62 and 63, change "lenghtwise" to be -- across the --
Line 63, change "in the same direction as the" to be -- orthogonal to a --

Signed and Sealed this

Eighth Day of October, 2002

*Attest:*

*Attesting Officer*

JAMES E. ROGAN
*Director of the United States Patent and Trademark Office*